June 13, 1944.  K. G. COMPTON  2,351,321
APPARATUS FOR THE MANUFACTURE OF ELECTROLYTIC CONDENSERS
Filed Sept. 27, 1941  2 Sheets-Sheet 1
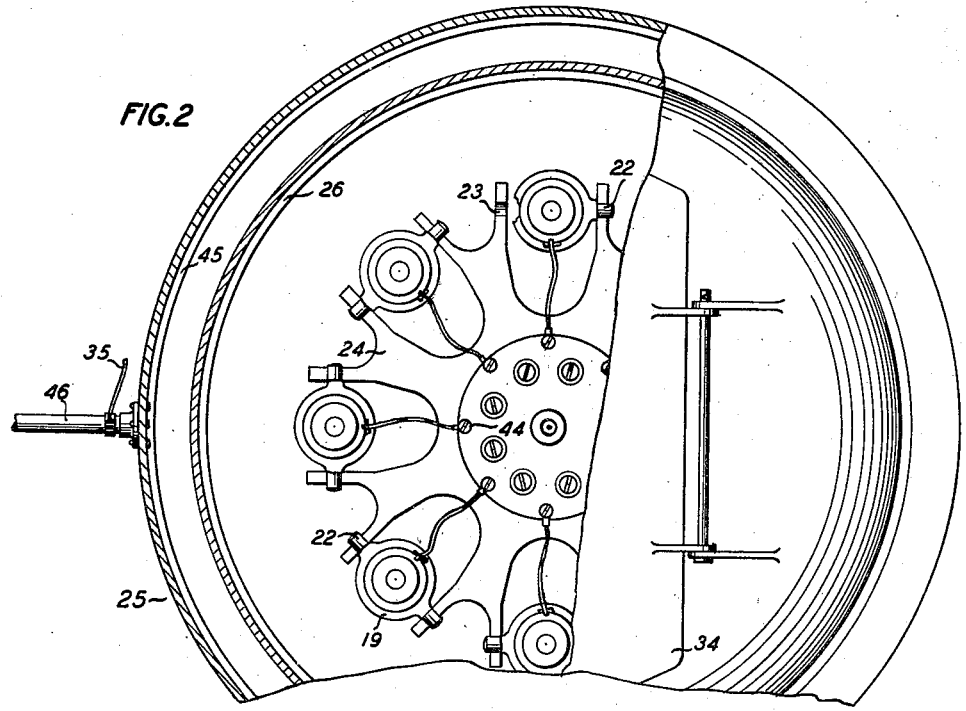
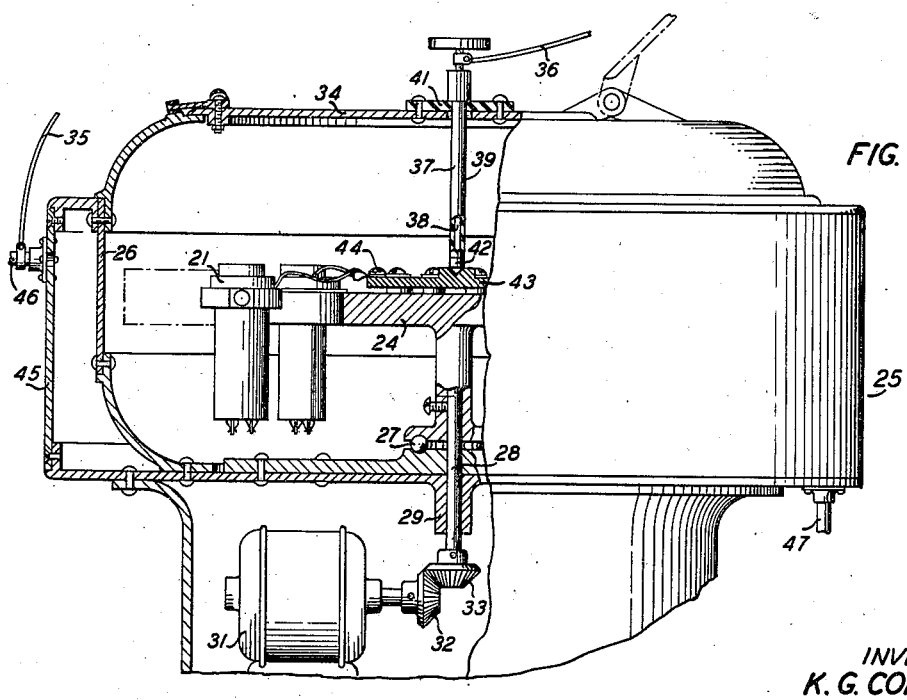
INVENTOR
K. G. COMPTON
BY
B. H. Jackson
ATTORNEY

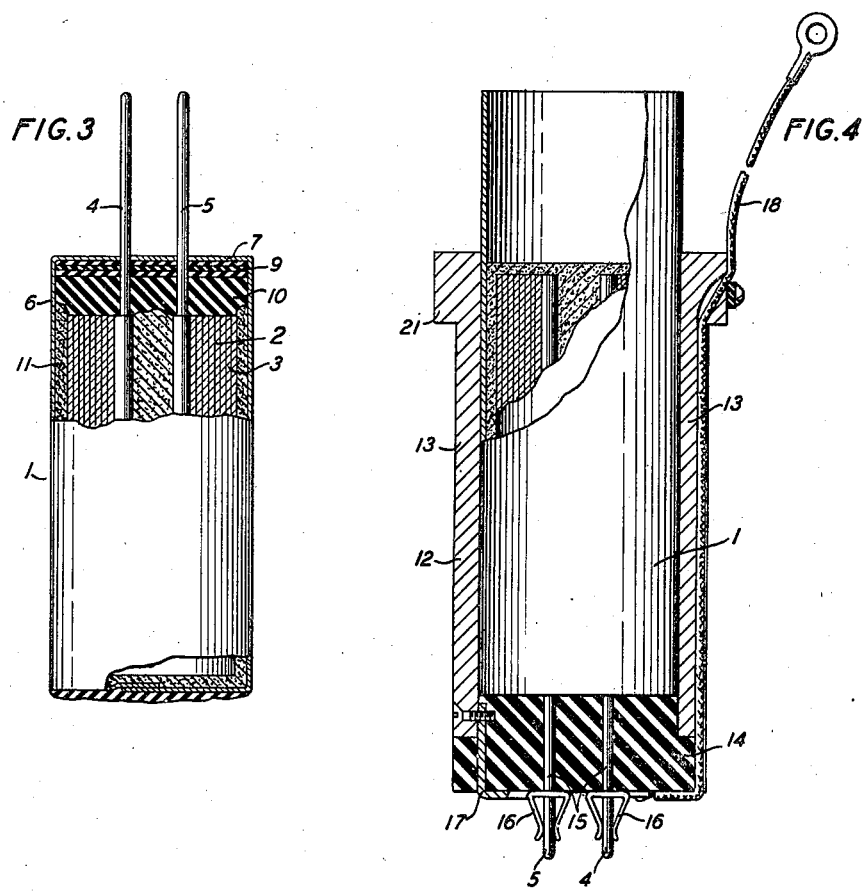

UNITED STATES PATENT OFFICE 2,351,321

APPARATUS FOR THE MANUFACTURE OF ELECTROLYTIC CONDENSERS

Kenneth G. Compton, Summit, N. J., assignor to Bell Telephone Laboratories, Incorporated, New York, N. Y., a corporation of New York Application September 27, 1941, Serial No. 412,530

4 Claims. (Cl. 175—315)

This invention relates to the manufacture of electrolytic condensers, and more particularly to apparatus for the impregnation of electrolytic condensers.

The electrolytic condensers to which the present invention relates are of a type including a pair of spaced metallic armatures or electrodes, constituting the plates of the condenser, at least one of which armatures has a dielectric film thereon, and a conductive electrolyte between said armatures. In such condensers the dielectric film on at least one of the metallic armatures, which is usually a film of the oxide of the metal of the armature, serves as the insulation between the armatures, while the conductive electrolyte in effect eliminates the space between said armatures. Usually the electrolyte is held in place between the armatures by being impregnated into porous sheet material, usually of textile or fabric, disposed between the armatures and serving as spacing means therebetween, although in some condensers the armatures may have no spacers therebetween in which the electrolyte is impregnated. The condenser is usually contained in a tight container which serves to protect it and prevents the escape of the electrolyte.

Most electrolytic condensers are of the roll type, being formed of two armatures, usually of metal foil, and at least two porous spacers, disposed in interleaved relation, the whole being rolled into spiral form. Electrolytic condensers are also of the stacked type in which a plurality of armatures and, if desired, spacers are disposed in stacked relation.

To minimize the possibility of leakage of the electrolyte and to prevent movement in the condenser of the electrolyte which might damage the dielectric film, it is common practice to employ a paste electrolyte or one which is a liquid of high viscosity at ordinary operating temperatures, so that the electrolyte does not flow readily if at all at such temperatures. For similar reasons it is common practice to impregnate the electrolyte in porous spacers between the armatures of the condenser. Quite often both these expedients are practiced, and a paste or high viscosity electrolyte is impregnated into porous spacers.

For economies in construction, it is the usual practice first to assemble the condenser assembly comprising the armatures and, if they are employed, the spacers, and to impregnate the assembly with the electrolyte. Usually the desired dielectric film is formed on one or both of the armatures prior to assembly and prior to impregnation of the condenser assembly. The condenser assembly may be thus impregnated while in or out of its container.

When a condenser assembly is impregnated with the electrolyte, however, difficulties are usually encountered in causing the electrolyte to penetrate into all interstices of the assembly and of the armatures so as to contact all the desired portions of the armatures. These difficulties are particularly troublesome when paste or high viscosity electrolytes are employed, even though such electrolytes are usually heated to reduce their viscosity during impregnation. Such difficulties are also aggravated when porous spacers, into which the electrolyte is impregnated, are employed, and are extremely troublesome when it is desired to impregnate paste or high viscosity electrolytes into condenser assemblies embodying porous spacers. Additional impregnation difficulties are encountered when one or more of the armatures of the electrolytic condenser has its surfaces roughened, as by etching, to increase its surface area and consequently the capacity of the condenser.

Usually, the dielectric film is formed on the desired armature or armatures before incorporation thereof into the condenser assembly, the methods for forming such film being well known in the art. In some cases, however, the armatures are assembled into the condenser unit, impregnated with a suitable electrolyte, and the film then formed on the armatures.

In either case, forming current must be passed through the condenser assembly after it is impregnated with the electrolyte. Where the armatures have no dielectric films thereon, the proper forming current, usually direct current, will form such a film on the desired armature; in cases where one or both of the armatures has previously had a dielectric film formed thereon, the purpose of the forming current is to repair the film, marring of which cannot be avoided during construction of the condenser assembly.

Passage of the forming current through the condenser assembly, however, causes gas bubbles to form in the electrolyte in the vicinity of one or more of the armatures, largely on the cathode on which the dielectric film is being formed. Such gas bubbles are formed as a by-product of the reaction forming the oxide film on the condenser armature, which is formed of some film-forming metal such as aluminum or tantalum. The presence of such gas bubbles in the electrolyte is harmful, since it reduces the volume, and hence the conductivity, of the electrolyte between the armatures, causing an increased resistance of the condenser, and also since it prevents complete contact of the electrolyte with the armatures of the condenser and hence reduces the effective plate area of the condenser with a consequent reduction in the capacity thereof. When paste or high viscosity electrolytes are employed, the gas bubbles tend to remain in the electrolyte upon solidification thereof so that such difficulties are permanent.

The present invention overcomes such difficulties in impregnating condenser assemblies, whether or not they contain spacer elements, whether or not they have etched or roughened armatures, and whether a forming current is passed through a previously formed condenser or through one in which the forming is accomplished after the assembly.

The apparatus of the present invention accomplishes the results by subjecting liquid electrolyte impregnated in a condenser assembly to a suitable pressure while a forming current is passed through the condenser assembly. The apparatus of the present invention is adapted to rotate a condenser assembly impregnated with a liquid electrolyte under conditions such that there is developed within the electrolyte a pressure due to centrifugal force sufficient to cause thorough impregnation of the electrolyte into all interstices of the condenser assembly and substantially complete removal of the gas bubbles which form during the passage of the forming current therethrough. Rapid, thorough and complete impregnation of electrolytic condensers and removal of the deleterious gas bubbles from the electrolyte are thus made possible by the invention. Besides the considerable saving in impregnation time provided by the invention, it also makes possible a great reduction in the aging time to which it is usually necessary to subject electrolytic condensers after manufacture.

These and other advantages of the invention will be more clearly apparent from the following discussion of the invention in connection with the accompanying drawings which show one form of apparatus for practicing the invention as well as one form of electrolytic condenser in connection with the manufacture of which the invention may be employed.

In the drawings:

Fig. 1 represents a side elevation of a centrifuging apparatus embodying the invention, parts being broken away to show the interior thereof with several condensers in place for centrifuging;

Fig. 2 represents a plan elevation of the apparatus of Fig. 1, parts being broken away to show the interior of the apparatus with said several electrolytic condensers in place therein;

Fig. 3 represents to a scale considerably larger than that of Figs. 1 and 2 one form of electrolytic condenser in the manufacture of which apparatus embodying the invention may be employed, parts being broken away to show the interior construction thereof; and Fig. 4 represents to the same scale as Fig. 2 a side sectional elevation of an electrolytic condenser of the type shown in Fig. 3 during the process of manufacture.

The complete condenser 1 shown in Fig. 3, in connection with the manufacture of which the present invention will be discussed for the purposes of illustration, comprises a condenser assembly 2 which includes a cylindrical roll 3, formed of two sheets of metallic foil such as aluminum foil spaced apart by suitable porous spacers such as paper, the whole being wrapped into a spiral. One of the sheets of foil has a dielectric oxide film formed thereon. Electrode 4 is suitably connected to one of said armature foils, while electrode 5 is suitably connected to the other of said armature foils. The condenser assembly 2 comprising the roll 3 and electrodes 4 and 5 is contained in a suitable container 6, in this case forming part of the complete condenser, through the top wall 7 of which the electrodes 4 and 5 project, the bottom wall 8 of the container being formed by the bent or spun over side wall thereof. The upper portion of the container adjacent the upper wall 7 is provided with several insulating sealing members 9, which may be formed of rubber or the like, and which insulate the electrodes 4 and 5 from the upper wall 7. A layer of suitable sealing material 10, which may be of asphaltic or similar composition, is disposed between the upper portion of the container 6 and the roll 3. In the illustrated embodiment such layer 10 of material is while molten poured into place after the condenser unit 2 has been inserted into the container 6 and, after solidification, serves to locate and hold the unit 2 within the container 6.

The electrolyte 11 fills substantially all of the remaining space within the container, being thoroughly impregnated into the condenser unit 2.

In the manufacture of the illustrated condenser, the condenser assembly 2 is first constructed by choosing suitable sheets of metallic foil, at least one of which has formed thereon the desired oxide film, assembling said sheets in interleaved relation with sheets of suitable spacing material, such as paper or fabric, attaching the electrodes 3 and 4 to said sheets at suitable positions, and winding the interleaved sheets into a roll. The assembly 2 is then placed into the container 6 with the electrodes 4 and 5 projecting through the end wall 7 and sealing members 9, after which the plastic material of layer 10 is poured therein. The end of the container through which the condenser unit is introduced is left open, the cylindrical wall of the container extending for some distance beyond the end of the condenser assembly. The condenser is then ready for impregnation according to the present invention.

In impregnating the electrolyte into the illustrated condenser in accordance with the present invention by means of the illustrated apparatus embodying the invention, the partially completed condenser is inserted into a tubular holder 12, shown to advantage in Fig. 4. The holder shown comprises a metallic sleeve member 13 having an interior bore which closely fits the exterior surface of the container 6 of the condenser, and an end plug 14 firmly fixed to the sleeve 13 and formed of some suitable insulating material such as hard rubber, phenol-formaldehyde resin, or the like. In the apparatus of Fig. 4, the base member 14 is shown as provided with apertures 15 adapted to have project therethrough the electrodes 4 and 5 of the condenser 1. The base member 14 is also provided with suitable clip members 16 which make electrical contact with said electrode members. One of said clip members 16 is shown as grounded to the metallic sleeve member 13 by conductor 17 while the other is connected to a flexible insulated conductor 18.

The holder 12 is carried by a supporting member 19 (Figs. 1 and 2) which is adapted to engage and support the holder by means of the shoulder 21 formed on the holder. The supporting member 19 is provided with pins 22 adapted to fit in cooperating recesses 23 in rotating spider member 24 of centrifuge 25.

The illustrated centrifuge comprises a closed housing member 26 which is circular in horizontal cross-section and has mounted therein for rotation about its central vertical axis the spider 24. In the apparatus shown, the spider 24 is rotatably mounted by bearing means 27 and drive shaft 28 to which the spider 24 is rigidly connected and which is rotatably journaled in boss 29 of housing 26 of centrifuge 25. Drive shaft 28 is shown as adapted to be driven at a high speed from the source of power, motor 31, through bevel gears 32 and 33. Housing 26 is provided with a hinged lid 34 in the top portion thereof, which may be closed during operation of the centrifuge and through which access may be had to the spider 24 and the condensers supported thereby.

The means shown for providing for the passage of forming currents through the condensers comprises a lead 35 grounded to the frame of the centrifuge 25. Another lead 36 is electrically connected to one end of a rigid downwardly extending conducting member 37, rigidly fixed to and passing through the lid 34 of housing 26 in such manner that when the lid is swung open the member 37 swings therewith. In the apparatus shown, the conducting member 37 comprises an interior conducting core 38 covered with insulating material 39 and is rigidly mounted by means of insulating member 41 on said lid 34 of housing 26. The lower end of member 27 comprises a contact member 42, connected to conducting core 38, adapted to make sliding contact with member 43 as it rotates during operation of the centrifuge. Said member 43, which is formed of electrically conducting material, is rigidly mounted on but insulated from spider 24. In the apparatus shown the flexible conducting lead 18 of each of the condenser holders 12 is connected to said member 43 by means of bolts 44. Therefore, when the lid 34 is closed as shown in Figs. 1 and 2, an electrical circuit is provided through lead 35 to the frame of the centrifuge 25, through the metallic tubular member 13 of each of the holders 12, through the clip 16 connected thereto, the electrodes 4 and 5 and condenser 1, through the clip 16 connected to lead 18, through member 43, conducting member 37 and through lead 36. The condensers in the centrifuge 25 are thus connected in parallel and the current is passed therethrough during operation in the direction necessary to cause the film to form on the desired armatures.

The illustrated centrifuge 25 is surrounded by a steam jacket 45 to which steam is supplied by means of conduit 46 and from which the steam and condensate are removed by means of conduit 47. The purpose of the steam jacket is to maintain the condensers during the centrifuging operation at a uniform elevated temperature to prevent solidification of the impregnating electrolyte and to maintain it in the liquid condition which will give the most satisfactory results during impregnation and forming.

In treating the partially completed illustrated condensers according to the invention by the illustrated apparatus, each such condenser is advantageously first heated to an elevated temperature corresponding to that of the impregnant, i. e., from about 75° C. to about 100° C. The condenser is then inverted so that the open end of the condenser extends upwardly, and the condenser container is then filled with electrolytic liquid at an elevated temperature until the upper level of the liquid extends for some distance above the bottom of the condenser roll, thus providing sufficient liquid to replace that forced into the interstices of the condenser unit during impregnation and still cover the condenser unit in the container. The container is then inserted into a holder 12 and supporting member 19 and is then mounted with other condensers on the spider 24 of the centrifuge 25. The interior of the centrifuge is maintained at about the elevated temperature of the electrolyte by means of the steam jacket 45.

The centrifuge is rotated at a high speed while forming current is passed through the condensers through the circuit described hereinbefore. The speed of rotation may be from about 1500 revolutions per minute to about 3000 revolutions per minute, depending in part upon the size of the condensers and of their distance from the axis of rotation of the centrifuge and upon the viscosity of the impregnating liquid. The pressure in the electrolyte developed by the speed of rotation, of course, should not be so great as to destroy the condensers. In general, pressures in the electrolyte of from about 75 to 300 pounds per square inch at the outer end of the condenser assembly as it is rotated in the centrifuge are satisfactory, with a pressure differential along the length of the condenser of about 10 to 40 pounds per square inch per inch of length of the condenser. Such pressures are sufficient to force the liquid electrolyte into all interstices of the condenser assembly and to remove the gas bubbles which form in the electrolyte due to the passage of the forming current through the condenser assembly. In the development of such pressures the speeds of rotation are in general sufficient to cause the condensers to be horizontally disposed during centrifuging.

The forming current which is advantageously and usually direct current, may be applied to the condenser before the rotation is started, as it is commenced, or after the rotation has been started, but it is advantageous that the full speed of rotation be first attained before the voltage is applied in order to facilitate removal of the gas bubbles as soon as they commence to form. In forming a film on a condenser armature during centrifuging, it is advantageous gradually to increase the voltage at such a rate as to maintain approximately constant current. The permissible current is governed by the speed of the centrifuge and by the viscosity and surface tension of the electrolyte. The current should be held below the point where gas escaping from the electrolyte tends to expel the electrolyte from the condensers. In general, maximum forming voltages of from about 50 to 100 volts are satisfactory, although higher voltages may be employed, if desired, as in forming high voltage condensers. The voltage is maintained until the desired degree of formation is achieved or until the current has dropped to less than about 10 milliamperes, after which the voltage may be removed and the condenser centrifuged for an additional length of time and, if desired, at a higher speed to insure complete penetration of the electrolyte and removal of all gas bubbles. The total time during which the centrifuging and passage of forming current is permitted to occur largely depends upon the amount of forming which is required. Previously formed armatures which merely require a forming operation to repair damage done in assembly require less treatment according to the invention than do condenser units on which no forming has been accomplished on the armatures.

After treatment with apparatus embodying the present invention, the illustrated condensers are removed from the holders, excess electrolyte is removed and the projecting end walls are bent or spun over to form the body of the condenser.

The following example is illustrative of the sequence of operations and conditions which may be employed in the present invention. A condenser of the design indicated in Fig. 3 was produced as follows: Aluminum foil sheets having a purity in the neighborhood of 99.993 per cent and a thickness from .001 to .003 inch were employed. The foil on which it was desired to form a dielectric film was continuously passed through a forming apparatus of the conventional type at the required voltage, being immersed in a forming electrolyte composed of a mixture of boric acid and borax in a solution the pH of which was approximately 6.5. Since the condenser was to operate on a voltage less than 100 volts, the concentration was slightly less than that required for saturation. The forming operation was carried on at room temperature without stirring and with the foil strip passing through the bath at approximately one foot per minute. The foil was then washed with distilled water and dried.

A formed foil, an unformed foil, and two spacers were placed in interleaved relation, with one of the spacers between the two foils. Each of the spacers was formed of two sheets of absorbent tissue paper which had been treated with viscose to improve its resistance to disintegration and which was free of deleterious ions such as chloride or sulphate ions. The electrodes 4 and 5 were electrically connected to their respective foils and then insulated and the foils and spacers were then wound into a compact cylindrical roll 3, as shown in Fig. 3 of the drawings, in such manner that the roll was made up of alternate foils and spacers. Several turns of the above-described paper were wound around the outside of the roll and cemented in place. The condenser unit 2 comprising the roll and electrode was then assembled as described above in an aluminum container, the bottom of which was left open for impregnation purposes as shown in Fig. 3.

The electrolyte which was impregnated into the condenser was similar to that described and claimed in K. G. Compton Patent 2,321,997, issued June 15, 1943. In making the electrolyte mannitol of high purity and having a low content of active ions such as chloride or sulphate ions was melted and boric acid or boric anhydride was added. The mixture was heated until it boiled and held there until a constant boiling point was reached, which indicated substantially complete esterification of the mannitol by the boric acid.

The mannitol borate thus formed was dissolved in an equal amount of hot water. The solution had a pH of approximately 2, this pH and others being determined by the colorimetric or glass electrode method. By the addition of sodium hydroxide, the pH of the solution was then raised to about 8.5 to increase its viscosity by causing it to gel. To minimize the harmful effect of the alkalinity in shortening the life of the condenser, sufficient boric acid and sodium borate was added in the form of a solution to reduce the pH to a value of about 7. The addition of such buffer mixture aided the conductivity of the electrolyte and stabilized its pH but did not appreciably reduce the viscosity thereof. The final pH of the electrolyte was determined after dilution until its water content was in the neighborhood of 50 per cent.

Water was then evaporated from the electrolyte to bring the water content thereof down to about 30 per cent, after which about 20 per cent of acetamide was added and thoroughly mixed therewith while its temperature was maintained at about 100° C. At this temperature, the electrolyte had a very low viscosity on the order of that of water, kerosene, or light oil. At room or ordinary operating temperatures, however, the electrolyte became very stiff and jelly-like in nature and had little or no tendency to flow, its viscosity at about 25° C. being at least about 100 centipoises.

In impregnating the partially completed condensers, the condenser units assembled in the containers were heated to a temperature of about 95° C. in an oven. Then a weighed quantity of hot electrolyte at approximately the same temperature was poured into each condenser, the amount of the electrolyte so added being sufficient to fill each condenser container for some distance above the bottom of the unit therein. The condenser was then plugged into holder 12, and was mounted in the centrifuge with other condensers, after which the centrifuge lid was closed. The centrifuge was then brought up to a speed of about 2000 revolutions per minute and forming voltage was applied for the purpose of repairing the dielectric film damaged in the construction of the condenser. At this speed, the condensers were substantially horizontal. At approximately 2000 revolutions per minute a current of 100 milliamperes was maintained on the 80 μ f. condenser until the maximum desired forming voltage of 75 volts is reached. This required between 5 and 10 minutes. A potential of 75 volts was then maintained for 15 to 20 minutes or until the current dropped to about 2 to 5 milliamperes, after which the voltage was cut off and the condenser centrifuged at about ? ) revolutions per minute for an additional 5 ι .iutes. After removal from the centrifuge the excess electrolyte was poured from each of the condensers and the extending cylindrical wall at the open end of the container was spun or bent over to form the bottom of the condenser. Thereafter the condensers were placed on the aging rack to cool.

By means of the apparatus of the present invention there may be readily produced completely formed, thoroughly and completely impregnated electrolytic condensers the electrolytes of which are free of detrimental gas bubbles which might tend to increase the resistance, reduce the capacity, or shorten the life of the condensers. Condensers so produced according to the present invention, indeed, in general have longer lives than similar condensers produced by other methods.

Because of the thorough impregnation and absence of gas bubbles in the electrolyte, the capacities and resistances of condensers of the same type may readily be made highly uniform in all condensers, which is very advantageous for telephone and radio work.

The present invention also provides a considerable saving in manufacturing time. Thus, the impregnating time may be greatly reduced, as well as the forming time and the time required in the aging racks.

Various modifications may be made in the processes, apparatus and examples indicated above. For example, while the invention has been discussed primarily in connection with condensers in which only one of the armatures has an oxide film thereon, the invention is equally applicable to the impregnation and forming of electrolytic condensers in which both armatures have oxide films formed thereon. In such a case, after one of the armatures has been formed the direction of the forming current can be reversed to form the other armature.

Moverover, while the apparatus of the invention has been primarily discussed in connection with the formation of a previously formed armature, it is obvious that, as indicated hereinabove, it may be employed in the impregnation and formation of an armature of a condenser having no previous oxide formation on the armature. While the above discussion was directed primarily to the impregnation of the condenser with the final electrolyte, it is apparent that the present invention is applicable to rapid procedures in which the condenser is impregnated and formed with one or more initial electrolytes before the final electrolyte is impregnated therein. While the above discussion was directed primarily to the use of heated electrolytes of normally high viscosity, it is apparent that the invention is equally applicable to the impregnation of low viscosity electrolytes which may be heated or unheated, as well as to the impregnation of electrolytes whose viscosities are high during the impregnation procedure. Furthermore, the invention is applicable to the impregnation of other kinds of electrolytes than that discussed in the example. For example, it lends itself well to the impregnation of electrolytes which are normally of the paste type, although liquified under the impregnating conditions.

Various modifications may also be made in the type of condenser illustrated as treated according to the invention as well as in the apparatus illustrated as embodying the present invention. Thus, while the major portion of the above discussion it devoted to roll type condensers, the present invention is equally applicable to stacked type electrolytic condensers. Moreover, the invention is also applicable to the manufacture of electrolytic condensers having one or both of its armatures formed of other materials besides the aluminum discussed above in the illustrative examples. Such other materials may be film-forming metals such as tantalum or zirconium.

Within the scope of the invention, various other modifications may be made in the apparatus and processes discussed above as embodying the invention.

It is intended that the patent shall cover by suitable expression in the appended claims whatever features of patentable novelty reside in the invention.

What is claimed is:

1. Apparatus comprising means for rotating an electrolytic condenser assembly having a liquid electrolyte impregnated therein about an axis of rotation spaced from said condenser assembly while said condenser assembly is disposed in an individual container which prevents the loss of electrolyte from said assembly due to rotation, said means being capable of rotating said condenser assembly at a speed such that a substantial pressure due to centrifugal force is developed in said electrolyte sufficient to remove from said electrolyte bubbles of gas in said electrolyte in the vicinity of an armature of said condenser assembly; and means for supplying a forming current to said condenser assembly during said rotation.

2. Apparatus comprising means for rotating a container having an open end and a closed end and adapted to contain a single condenser assembly having a liquid electrolyte impregnated therein about an axis spaced from said container while said container is disposed with its closed end extending away from said axis and its open end extending toward said axis, at a speed such that a substantial pressure due to centrifugal force is developed in said electrolyte sufficient to remove from said electrolyte bubbles of gas in said electrolyte in the vicinity of an armature of said condenser assembly; and means for supplying a forming current to said condenser assembly during said rotation.

3. Apparatus comprising a rotatable support; a container having a closed end and an open end and adapted to contain a condenser assembly having a liquid electrolyte impregnated therein pivotally mounted on said support at a point spaced from said axis of rotation of said support so that the closed end of said container may swing away from said axis of rotation during rotation of said container carried by said support; means for rotating said support at a speed such that a substantial pressure due to centrifugal force is developed in said electrolyte sufficient to remove from said electrolyte bubbles of gas in said electrolyte in the vicinity of an armature of said condenser assembly; and means for supplying a forming current to said condenser assembly in said container during said rotation.

4. Apparatus comprising means for rotating an electrolytic condenser assembly, having one end thereof closed and having a liquid electrolyte impregnated therein, about an axis of rotation spaced from said condenser assembly while said condenser assembly is disposed with said closed end extending away from said axis of rotation, said means being capable of rotating said condenser assembly at a speed such that a substantial pressure due to centrifugal force is developed in said electrolyte sufficient to remove from said electrolyte bubbles of gas in said electrolyte in the vicinity of an armature of said condenser assembly; and means for supplying a forming current to said condenser assembly during said rotation.

KENNETH G. COMPTON.